Sept. 10, 1935.   M. E. PENNINGTON   2,013,896
METHOD FOR FREEZING EGGS
Filed Dec. 30, 1932   2 Sheets-Sheet 1
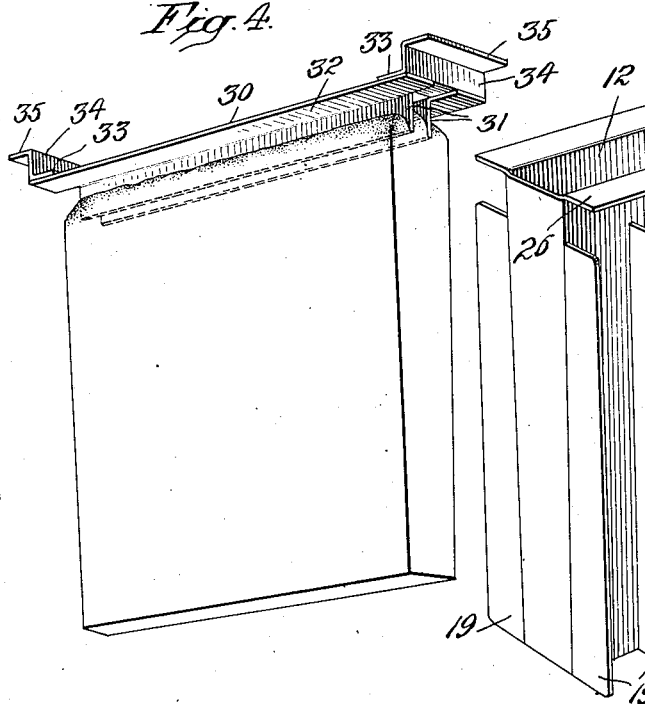
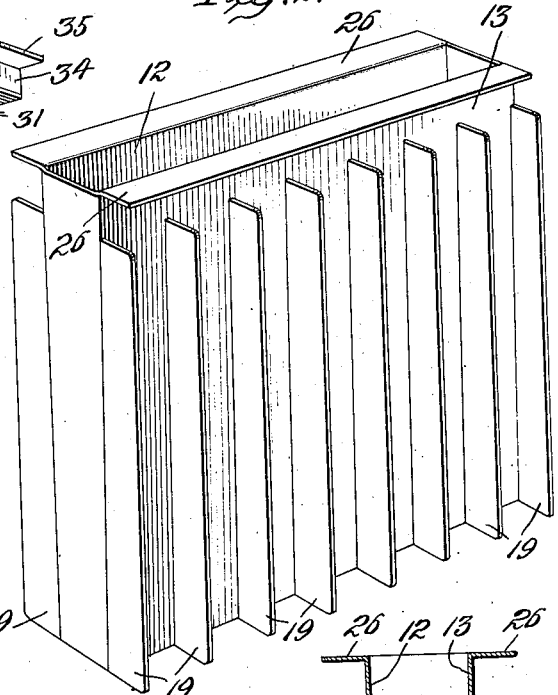
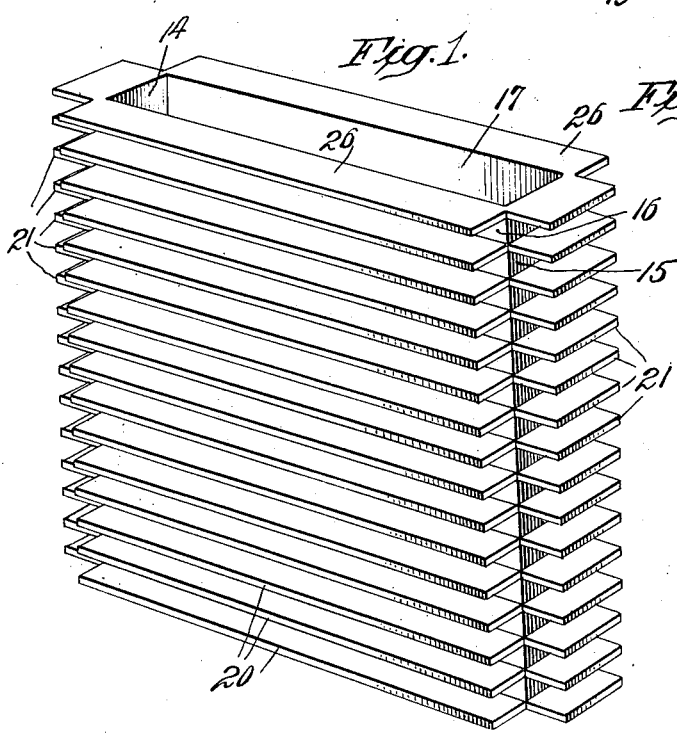
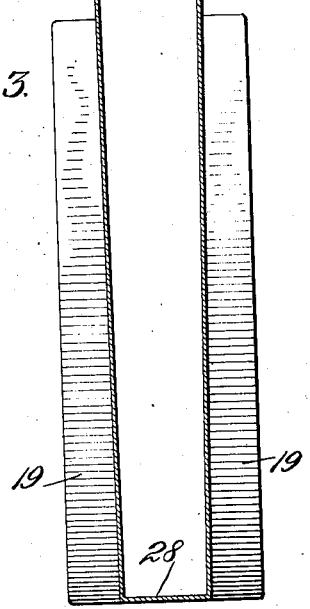

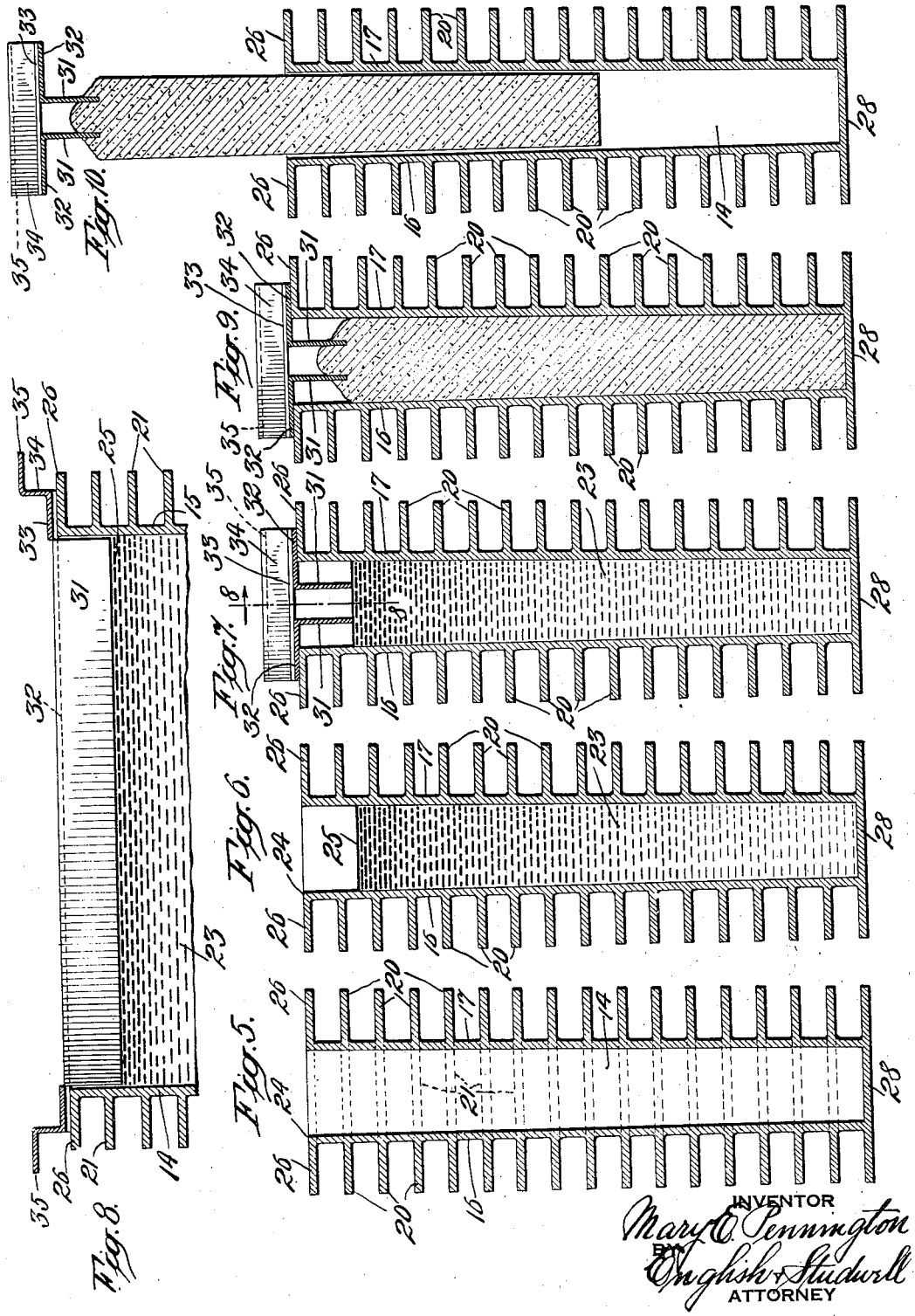

Patented Sept. 10, 1935

2,013,896

UNITED STATES PATENT OFFICE 2,013,896

METHOD FOR FREEZING EGGS

Mary E. Pennington, New York, N. Y., assignor to The Borden Company, New York, N. Y., a corporation of New Jersey Application December 30, 1932, Serial No. 649,525

5 Claims. (Cl. 99—14)

This invention relates to the production of frozen egg, and to apparatus employed in connection therewith.

An object of the invention is to produce, as a new article of manufacture, frozen egg which when thawed will more nearly resemble in appearance and in quality egg magma freshly removed from the shell than the frozen eggs heretofore produced.

Another object is to provide a method for efficiently preserving egg.

The common commercial practice for the production of frozen eggs is to remove the egg meats from the shells, then introduce the mixed whites and yolks, or the whites and yolks separately, into cylindrical containers which are placed in a refrigerating chamber. The capacity of these containers range from 10 to 50 pounds of eggs, an average size container holding about 30 pounds of eggs. The temperature of the refrigerating chamber may vary from 0° F. to —25° or —30° F. The freezing of the entire contents of the cans requires from 36 to 72 hours, and sometimes as much as 96 hours, depending on the size of the cans and the temperature of the refrigerating chamber.

It has long been recognized that the slow freezing of eggs results in an inferior product, and various expedients have been proposed to shorten the time of freezing, but nevertheless, freezing egg magma and the relatively large cylindrical containers continues to be the common practice, apparently because of lack of a better method heretofore, and up to the present time more frozen egg is produced in that manner than in any other. The disadvantages of the long period freezing include not only the inferiority of the product but also the large space required and loss of time. The inferiority of the product results from the fact that the slow freezing permits the watery constituents of the egg magma to develop into crystals of large size, sometimes from 3 to 5 inches in length, which begin to form at the inner surfaces of the containers and grow inwardly penetrating and so breaking down the solid parts or natural egg structure. Moreover, as the watery constituents of the egg magma freeze first near the surfaces of the container, a large proportion of the solids migrate toward the center of the container and freeze last. Hence the frozen egg magma in the container is not homogeneous, and the whole of the contents of the container must be thawed to give the user a reconstituted egg material. Moreover, egg magma frozen in this manner thaws out into a mass resembling yellow curds and pinkish whey which must be thoroughly mixed to reconstitute the egg.

Another disadvantage in the common practice of freezing egg magma in relatively large cylindrical containers lies in the difficulty of removing the frozen egg magma from the container. Such crude methods as sawing or splitting the containers open with a hatchet are frequently resorted to.

One feature of the present invention is the step of preparing the egg for the freezing operation in such form that the rapid freezing thereof will be facilitated. It is now well recognized that when organized structures are rapidly frozen no substantial disruption of the organized structure takes place during the freezing and that therefore, the frozen material when thawed is restored substantially to its pristine condition. In accordance with this well recognized principle it has been proposed heretofore to freeze egg magma rapidly and various expedients have been suggested for that purpose. It has, however, never been proposed, so far as I am aware, to freeze eggs in relatively small quantities, for example, as relatively thin slabs of a given or predetermined size, and of sufficient thickness to safeguard the slab from transverse fracture in ordinary handling.

By introducing the unfrozen egg magma into a receptacle of highly thermally conducting material and having internal dimensions which are those of the desired slab-frozen egg and exposing the container to a suitable refrigerating medium, as for example, immersing it in circulating low temperature brine, a relatively rapid freezing of the egg magma takes place which prevents migration of the solid egg material from the inner surfaces of the container toward the center thereof. In fact the freezing takes place so rapidly that the crystals of the watery constituents of the egg are minute or microscopic in size. In common with other freezing bodies we find in a container the egg material begins to freeze first at the inner surfaces of the container and the crystals arrange themselves normally thereto and grow inwardly. But owing to the fact that, according to the present invention, the container is provided with two relatively large flat surfaces, the distance between which determines the thickness of the slab of frozen egg, a great majority of the crystals grow inwardly from these two relatively large flat surfaces and are arranged transversely thereof or normal to each surface. Crystals will, of course, form at the three other surfaces and point inwardly as well as at the upper surfaces of the egg magma. But the number of these crystals is relatively small in comparison with the number of crystals forming at the two relatively large flat surfaces. Hence the slab of frozen egg magma produced according to the present invention is characterized by the fact that the slab is relatively thin, has two relatively large flat surfaces, the egg material is substantially homogeneous throughout owing to the rapid freezing thereof, the crystals of the watery constituents of the egg are minute in size and are arranged normal to or substantially transversely of the two large flat surfaces.

When compositions such as egg magma are frozen in containers, of whatever size and shape, the freezing of the material in contact with the inner surfaces of the container takes place first, whereas the freezing of the material in the middle or upper central portion of the container, which may have only one-third or less volume than the rest of the container, requires longer to freeze than the other two-thirds or more of the container. This phenomenon is so noticeable that sometimes in the freezing of the large cylindrical cans of egg magma it has been found that the egg material in the center of the cans has deteriorated in quality to such extent that the contents of the can have spoiled. I have found, in freezing magma in relatively thin slab-like masses, that the upper middle portion of the egg magma, small relatively in volume to the rest of the mass, requires as long a time to freeze as the rest of the mass and that during the time this upper middle portion of the egg magma freezes the remaining frozen part of the egg undergoes deterioration. I have accordingly devised a means for facilitating the freezing of the upper open central part of the egg magma so that it will be frozen substantially as soon as the remainder of the egg magma is thoroughly solidified, and so that the whole quantity of egg magma within the container will have frozen within a period of time during which no deterioration of the egg material takes place.

If the top of the slab were to be frozen at exactly the same time as the bottom and sides of the slab, the frozen outside part of the slab would first form a jacket entirely enclosing the as yet unfrozen center of the slab. When the egg magma freezes, it undergoes considerable expansion, so that the rigid frozen jacket around the expanding center of the slab would be subjected to an enormous pressure which would be more than sufficient to burst and distort the slab. It has been found necessary therefore to avoid the accumulation of pressure developed at the center of the slab while the slab is being frozen, and at the same time to facilitate the freezing of the upper central part of the slab.

By effectively connecting the upper central portion of the egg magma in the container in thermally conducting relation with the refrigerating medium, the freezing of this portion of the egg magma is hastened or facilitated to such an extent that substantially by the time the remainder of the egg magma in the container is frozen, this portion of the egg magma has also become solidified and the slab of frozen egg magma is in condition for removal from the container and for storage in a refrigerated chamber where it may be kept until required for use. The delay in freezing the upper central part of the slab is thus largely or practically entirely overcome.

To facilitate removing the frozen egg magma from the container it is preferably made wedge-shape, that is to say, the two relatively large flat sides of the container are wider apart at the top than at the bottom. The two edge portions of the container, however, may be substantially parallel. The invention may employ various forms of containers which are relatively thin and have two relatively large substantially flat surfaces, provided these flat surfaces are near enough together to rapidly freeze the magma therebetween, and far enough apart to make the slab adequately strong in a transverse direction, as hereinafter referred to.

A preferred form of container is shown in the accompanying drawings in which Fig. 1 is a perspective view of a container composed of aluminum and provided on its exterior surfaces with horizontally disposed fins or webs adapting it for immersion in a liquid refrigerating medium in which the medium is flowed or circulated horizontally; Fig. 2 is a perspective view of a modified form of container composed of copper and provided with vertically arranged fins adapting the container for immersion in a refrigerating medium which is circulated vertically; Fig. 3 is a section taken transversely of the container shown in Fig. 2; Fig. 4 is a perspective view of a slab of frozen egg magma as produced in the containers shown in Figs. 1 and 2 and having attached to the top thereof the device for facilitating the freezing of the upper middle portion of the egg magma; Fig. 5 is a section taken transversely of the container shown in Fig. 1; Fig. 6 is a view similar to Fig. 5 but with the liquid egg magma therein; Fig. 7 is a view similar to Fig. 6 but with the device mounted thereon for facilitating the freezing of the upper middle portion of the egg magma; Fig. 8 is a longitudinal section taken on the line 8—8 of Fig. 7; Fig. 9 is a view similar to Fig. 7 but with the egg magma shown in frozen condition; and Fig. 10 is a transverse sectional view showing the slab of frozen egg magma in process of being removed from the container.

The size of the slab of frozen egg produced according to the present invention may be of any given or predetermined dimensions, the only requirement being that it be thin relatively to its height and width. The thickness of the slab will depend partly upon the temperature of the brine or other liquid refrigerating medium in which it is proposed to immerse the container and partly upon the time it is considered best within which to accomplish the complete freezing of the egg magma. Since the slabs of frozen egg may be of any desired weight, the width and height of the slabs will vary accordingly, the thickness of the slabs depending more upon the time required for freezing than its relation to the width and height of the slab, although it is important, particularly when a larger slab is to be produced, to provide adequate transverse strength to safeguard the slab from transverse fracture when handled, in view of its increased weight.

I have found that a highly satisfactory frozen egg can be produced in a container about one and one-half inches in thickness, the width and height being of any desired value within a wide range. Such a slab of egg material can be completely frozen in about 15 minutes when the container is immersed in a brine of about —20° F.

As shown in Figs. 1 and 2 the preferred form of container is an open top vessel of highly thermally conducting material, preferably aluminum, although any other suitable metal may be used.

The container has a substantially rectangular form, except that as clearly shown in Fig. 3, the walls 12 and 13 of the container are slightly farther apart at the top than at the bottom, thereby resulting in a wedge-shape formation of frozen egg material, whereas the two ends of the container are substantially parallel as indicated at 14 and 15 in Fig. 8. The two sides of the container designated 12 and 13 in the container shown in Figs. 2 and 3, and 16 and 17 in the container shown in Fig. 1, and in Figs. 5 to 10, are relatively large, substantially flat surfaces on the inside of the container, thereby resulting in a slab of frozen egg material having two relatively large, substantially flat surfaces the distance between which determines the thickness of the slab of frozen egg.

The thickness of the walls of the container will depend partly upon the character of the metal of which it is composed and partly upon the length of time in which it is desired to complete the freezing step. The walls of containers composed of aluminum give more satisfactory results, I have found, if they are somewhat thicker than the walls of containers composed of copper, as indicated in the drawings which roughly indicate the preferred relative thicknesses of the metals. Satisfactory frozen egg has been produced in plain containers, but a frozen egg having superior qualities has been produced in fin containers, and I prefer to use containers finned substantially as shown in Figs. 1 and 2. Since copper is a better heat conductor than aluminum the copper container will be provided with fewer fins than the aluminum container. The proportions of the container as shown in Figs. 1 and 2 are substantially those of containers actually used in producing a satisfactory high grade frozen egg.

The arrangement of the fins on the containers will depend upon the direction of flow or circulation of the brine or other refrigerating medium. If the brine is caused to circulate vertically, the container will be provided with vertically-arranged fins as indicated at 19 in Figs. 2 and 3. If on the other hand the brine or other refrigerating medium is flowed or circulated in a horizontal direction, or if the container is moved horizontally through the refrigerating medium, the container will be provided with longitudinally arranged fins as indicated in Fig. 1, and Figs. 5 to 10, the lateral fins being indicated at 20 and the fins arranged at the ends of the container being indicated at 21.

It will be noted that the copper container shown in Fig. 2 is not provided with end fins, copper being such a good conductor of heat that the use of end fins has been found unnecessary. In this connection it may be said that if copper is employed for the container it should be thoroughly tinned to prevent contact of the egg magma with the copper, and for that reason it has been found convenient to employ aluminum as a metal out of which to construct the containers, since by providing the aluminum container with a sufficient fin area satisfactory results are obtained.

In carrying out the improved method of producing frozen egg, the egg meat having been removed from the shell, and the yolk and egg mixed together, or the whites and yolks separated, is placed in the container where it is indicated at 23 in Figs. 6, 7 and 8. If whole frozen egg meat is to be produced the whites and yolks will be thoroughly mixed together by the gentlest of mechanical action and in such manner as to present the mixing of air with the egg magma. The most approved practice is to mix the yolks and whites together to produce a homogeneous appearing liquid, in such a manner that the original mechanical structure of the yolks and eggs is disturbed as little as possible. The mixing operation is carried on gently to such a degree that the separate appearance of either the whites or yolks in an unmixed state is obliterated while preserving the original mechanical structure of the egg as far as possible. The breaking down of the mechanical structure of the egg by harsh mechanical action, as for example, by passing the egg meat through colloid mills, over knife and saw edges, and the like, results in a frozen mass which when thawed is very thin.

Since the egg magma expands on freezing in the container, it is desirable that the level of the liquid egg in the container be well below the top 24 of the container as indicated at 25 in Fig. 6. The container with the liquid egg magma therein will then be immersed in vertical position in the brine or other liquid refrigerating medium, in which it may be suspended by placing the top flanges or fins 26 on suitably arranged supports, or the container may first be immersed in the brine and then the egg magma poured into it. The container is no sooner immersed in the refrigerating medium than the egg material in contact with the inner surfaces of the container begins to freeze and a frozen mass grows rapidly toward the center of the container. Since the two side walls of the container are relatively large and the container is relatively narrow or thin the greater part of the freezing takes place at the side walls and proceeds inwardly from each wall toward the opposite wall, only a relatively small part of the freezing being accomplished at the two end walls and at the bottom 28 of the container.

The freezing proceeds so rapidly that the solid constituents of the egg material have no opportunity to migrate toward the center or middle portion of the container and the watery constituents freeze solid in the form of very minute crystals which do not penetrate the mechanical structure of the egg material with the result that when the egg is thawed it returns to substantially the same condition in which it existed before freezing, if thawed immediately after freezing. With a refrigerating medium of about —20° F. temperature and a container the relatively large flat side walls of which are not more than about one and one-half inches distance apart the greater portion of the egg magma could be frozen solid in about 15 minutes. The upper middle portion of the egg magma will, however, not freeze for about 10 or 15 minutes longer unless means are employed to facilitate the freezing of this portion of the egg magma.

Hastening or facilitating the freezing of the upper middle portion of the egg magma in the container is accomplished by providing the container with the device indicated in perspective at 30 in Fig. 4. This device comprises two longitudinally parallelly arranged vertical plates 31 projecting downwardly from two longitudinally parallelly arranged flanges 32 adapted to rest on and be supported by the top flanges 26 of the container. The plates 31 extend downwardly into the container such distance that when the upper surface of the egg magma is at a predetermined height in the container, as indicated at 25 in Figs. 6, 7 and 8, the bottom edges of the plates 31 are in contact with the surface 25 of the liquid egg magma. To aid in placing the device in the open top of the container and also to aid in removing the slab of frozen egg from the container the flanges 32 are provided at each end with a handle-like contrivance in the shape of an S-shaped angle piece consisting of a base 33 secured to the upper surface of the ends of the flanges 32, an upright portion 34 and an outwardly projecting flange or handle 35.

It is necessary that the lower edges of the vertical plates 31 be in contact with the upper surface 25 of the liquid egg magma in the middle top portion of the container, as otherwise there will be much slower conduction of heat from the upper middle portion of the egg magma, through the heat conducting device to the container and thence to the refrigerating medium. As the freezing of the egg magma progresses the egg mass swells upwardly within the container and that part in contact with the vertical plates 31 mounts upwardly along the plates on both sides thereof and firmly grips them so that when the egg mass in the container is completely frozen it may be removed from the container by means of the heat conducting device which will then serve as a handle for depositing the slab frozen egg at the point required, whether in a single carton or in a carton or box adapted to hold a relatively large number of the slabs.

The manner of growth of the upper portion of the egg mass in the container about the plates 31 is substantially as indicated in Figs. 7, 9 and 10. Such is the efficiency of the heat conducting device in contact with the upper middle portion of the mass of egg material in the container that this portion of the egg material may be frozen solid substantially as soon the remainder of the egg material in the container is frozen. Since the time required to complete the freezing of the slab is so materially reduced, it is possible for the freezing of the upper part of the slab to lag slightly behind the freezing of the other parts of the slab without endangering the quality of the egg.

Owing to the fact that the container is provided with two relatively large flat inner surfaces or walls separated only a substantially short distance apart, and that the other three surfaces of the container, and the top surface of the mass of egg material in the container are of small area relatively to the area of the two large flat surfaces, it will be understood that the growth of the greater proportion of the crystals of the frozen watery constituents of the egg material takes place at the two large flat surfaces, proceeds inwardly from each surface toward the opposite surface and that these crystals are arranged normally to the large flat surfaces and substantially transversely thereof, the crystals growing inwardly from the two ends of the egg mass and from the bottom thereof being relatively few in number and the crystals forming at the top of the egg mass and in contact with the vertical conducting plates 31 being also relatively few in number.

Microscopic examinations of sections of the slab of frozen egg material taken in all directions through the slab show the egg material to be substantially homogeneous throughout the whole mass and that the great majority of the crystals thereof are arranged transversely of the two relatively large flat surfaces of the slab. The thawing of the slab of frozen egg material without visible separation of solids and liquids establishes the substantial homogeneity of the egg material throughout the frozen mass and that there has been substantially no migration of the solid constituents toward the center of the mass during the freezing.

When the freezing of the egg magma in the container is completed the container is removed from the refrigerating medium by means of the handles 35 of the heat conducting device and the container dipped into or sprayed with cold water. In a few moments the adhesion between the frozen egg mass and the inner surfaces of the container will be broken and the slab of frozen egg material is readily removed. It is thence conveyed to the point of deposit, and the grip the upper portion of the frozen egg has on the conducting plates 31 is broken by placing a heated member on the top surfaces of the flanges 32, whereupon in a few seconds the heat conducting device may be removed from the slab of frozen egg and the latter packed in containers and placed in storage at a subfreezing temperature.

It will be understood that the pure egg material referred to above, whether the whites alone, the yolks alone, or a mixture thereof, may be supplemented by the thorough mixing therewith of other edible substances, such as preservative agents, condiments, spice, coloring matter or other suitable accessory substances without departing from the invention as set forth in the appended claims.

What is claimed is:—

1. The method of producing a homogeneous frozen egg magma which consists in partially filling and confining the unfrozen egg magma in an open top container thin relatively to its depth and width and immersed in a liquid refrigerating medium with the container dimensions such as to permit crystallization expansion of the magma within the container, and facilitating freezing of the upper middle portion of the egg magma by placing in the upper middle portion one end of a heat conducting material that adheres to the upper middle portion of the egg magma, the other end of which is conductively connected with the refrigerating medium.

2. The method of producing a slab of frozen egg magma which consists in partially filling the unfrozen mass of egg magma in a relatively thin slab-like container having an open top with crystallization expansion confined within the container, immersing the container in a refrigerating medium, and facilitating freezing of the upper middle portion of the egg magma by conductively connecting the upper middle portion with the refrigerating medium.

3. The method of producing a slab of frozen egg magma which consists in partially filling a relatively thin slab-like container having an open top with an unfrozen mass of egg magma to permit crystallization expansion of the egg magma within the container, immersing the container in a refrigerating medium and facilitating freezing of the upper middle portion of the egg magma concurrently with the remainder of the egg magma by conductively connecting the upper middle portion thereof spaced from the walls of the container with the refrigerating medium.

4. The method of producing a slab of frozen egg magma which consists in partially filling a relatively thin slab-like container having an open top with an unfrozen mass of egg magma to permit crystallization expansion of the egg magma within the container, immersing the container in a refrigerating medium and facilitating freezing of the upper middle portion of the egg magma concurrently with the remainder of the egg magma by immersing one end of a heat conducting material into the upper middle portion for adherence to the frozen egg magma, the other end of which is conductively connected with the refrigerating medium.

5. The method of producing a slab of frozen egg magma which consists in partially filling a relatively thin slab-like container having an open top with an unfrozen mass of egg magma to permit crystallization expansion of the egg magma within the container, immersing the container in a refrigerating medium and facilitating freezing of the upper middle portion of the egg magma concurrently with the remainder of the egg magma by immersing one end of a heat conducting material into the upper middle portion of the egg magma and in spaced relation to the walls of the container for adherence to the frozen egg magma, the other end of which is conductively connected with the refrigerating medium.

MARY E. PENNINGTON.